US008850230B2

(12) United States Patent
Schnell et al.

(10) Patent No.: US 8,850,230 B2
(45) Date of Patent: Sep. 30, 2014

(54) CLOUD-BASED MOVABLE-COMPONENT BINDING

(75) Inventors: Patrik Schnell, Issaquah, WA (US); Alexandre V Grigorovitch, Redmond, WA (US); Kedarnath A Dubhashi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 832 days.

(21) Appl. No.: 12/014,079

(22) Filed: Jan. 14, 2008

(65) Prior Publication Data

US 2009/0183010 A1 Jul. 16, 2009

(51) Int. Cl.
| | |
|---|---|
| *G06F 12/14* | (2006.01) |
| *H04L 29/06* | (2006.01) |
| *H04L 9/32* | (2006.01) |
| *H04W 12/06* | (2009.01) |
| *G06F 21/10* | (2013.01) |

(52) U.S. Cl.
CPC ........... *H04L 9/3271* (2013.01); *H04L 2209/80* (2013.01); *H04L 2209/603* (2013.01); *H04L 63/0853* (2013.01); *H04L 2209/56* (2013.01); *H04L 9/3263* (2013.01); *H04W 12/06* (2013.01); *G06F 21/10* (2013.01)
USPC .............. 713/193; 713/192; 713/155; 713/1; 713/2; 713/168; 713/172; 726/2; 726/4; 726/6; 726/17; 726/9; 726/20; 726/21; 709/206

(58) Field of Classification Search
USPC ................. 713/193, 192, 1, 2, 155, 168, 172; 726/2, 4, 6, 17, 9, 20, 21; 709/226
See application file for complete search history.

(56) References Cited

U.S. PATENT DOCUMENTS

| | | | |
|---|---|---|---|
| 6,934,531 B1 | 8/2005 | Hake et al. | |
| 7,178,034 B2 | 2/2007 | Cihula et al. | |
| 7,805,614 B2 * | 9/2010 | Aull et al. | ...................... 713/186 |
| 8,090,939 B2 * | 1/2012 | Ali et al. | ........................ 713/156 |
| 8,533,858 B2 * | 9/2013 | Byun et al. | ........................ 726/29 |
| 2002/0184491 A1 * | 12/2002 | Morgan et al. | ................. 713/157 |
| 2003/0161335 A1 * | 8/2003 | Fransdonk | .................... 370/401 |
| 2004/0158716 A1 | 8/2004 | Turtiainen et al. | |

(Continued)

FOREIGN PATENT DOCUMENTS

| | | |
|---|---|---|
| JP | 2005525714 | 8/2005 |
| LU | EP1770940 A1 | 4/2007 |
| WO | WO-9607256 | 3/1996 |
| WO | WO-0141104 | 6/2001 |

OTHER PUBLICATIONS

Wong et al., "Mutual Authentication and Key Exchange for Low Powerwireless Communications", IEEE MILCOM 2001, Conference Proceedings, 2001, pp. 1-7.

(Continued)

*Primary Examiner* — Mohammad A Siddiqi
(74) *Attorney, Agent, or Firm* — Micah Goldsmith; Glen Johnson; Micky Minhas (57) ABSTRACT

This document describes tools capable of enabling cloud-based movable-component binding. The tools, in some embodiments, bind protected media content to a movable component in a mobile computing device in a cryptographically secure manner without requiring the movable component to perform a complex cryptographic function. By so doing the mobile computing device may request access to content and receive permission to use the content quickly and in a cryptographically robust way.

18 Claims, 6 Drawing Sheets

(56) References Cited

U.S. PATENT DOCUMENTS

| | | |
|---|---|---|
| 2005/0020308 A1 | 1/2005 | Lai |
| 2005/0113069 A1 | 5/2005 | Knauerhase et al. |
| 2005/0130585 A1* | 6/2005 | Gnuschke et al. ........... 455/3.06 |
| 2005/0137889 A1 | 6/2005 | Wheeler |
| 2005/0165711 A1 | 7/2005 | Hamatsu |
| 2005/0266886 A1 | 12/2005 | Chan |
| 2006/0089124 A1 | 4/2006 | Frank et al. |
| 2006/0206710 A1* | 9/2006 | Gehrmann ................... 713/168 |
| 2006/0282680 A1 | 12/2006 | Kuhlman et al. |
| 2007/0055873 A1 | 3/2007 | Leone et al. |
| 2007/0079381 A1* | 4/2007 | Hartung et al. ................ 726/26 |
| 2007/0094737 A1 | 4/2007 | Larsson et al. |
| 2007/0185878 A1 | 8/2007 | Fierstein et al. |
| 2007/0192590 A1 | 8/2007 | Pomerantz et al. |
| 2008/0089517 A1* | 4/2008 | Bianco et al. ................ 380/259 |
| 2008/0118061 A1* | 5/2008 | Yang et al. ................... 380/200 |
| 2008/0209224 A1* | 8/2008 | Lord .............................. 713/185 |
| 2009/0012805 A1* | 1/2009 | Schnell et al. .................... 705/1 |
| 2009/0327702 A1* | 12/2009 | Schnell ......................... 713/155 |

OTHER PUBLICATIONS

"PCT Search Report and Written Opinion", Application No. PCT/US2008/086091, (May 29, 2009),11 pages.

Urien, Pascal et al., "Integrating EAP in SIM-IP smartcards", *Smartcard Research Center*, Available at <http://www.infres.enst.fr/~hecker/mmqos/papers/aswn_2002.PDF>,(2002),6 pages.

"Foreign Office Action", Chinese Application No. 200880125024.2, (Apr. 20, 2012),7 pages.

"Foreign Office Action", Japanese Application No. 2010-542233, (Mar. 29, 2013), 6 pages.

Davies, et al., "Security for computer networks: an introduction to data security in teleprocessing and electronic funds transfer", *John Wiley & Sons, Inc. New York, NY*, ISBN: 0-471-90063-X,(Dec. 5, 1985), 19 pages.

* cited by examiner

CLOUD-BASED MOVABLE-COMPONENT BINDING

BACKGROUND

Users enjoy protected media content in many different ways. Users can enjoy content in ways dictated by a traditional content distributor such as a radio station or movie theater by listening to songs on the radio or watching movies in the theater. Users also enjoy content using physical media usually purchased from another type of content distributor, e.g., through purchasing songs on CD or movies on DVD from a store.

More recently, users have been able to access protected media content digitally, either by recording content or accessing content through services that provide content according to subscription, purchase, rental, or other business models. Many users, for example, wish to download and use protected media content in mobile computing devices, such as cellular phones and the like. This content may include songs, music videos, ring tones, movies, and computer games, for example.

There are significant challenges for distribution services distributing content to mobile computing devices, however. Some distribution services follow procedures for distributing content that are vulnerable to malicious attacks attempting to steal protected media content. Others take considerable amounts of time. Some content distribution services for mobile computing devices, for example, rely on relatively slow components to perform complex cryptographic functions, which may result in a delay of seconds or even minutes between when a mobile computing device requests to use protected media content and receiving permission for that use.

Further still, users often wish to buy new mobile computing devices, such as a new cellular phone or Personal Digital Assistant (PDA). In doing so, current distribution services often expend significant bandwidth and/or compromise the content's security to provide that content to the new device. Users, in turn, may also expend additional time and money to regain their content on their new device. This can be irritating to users and in some cases cause users to switch mobile service providers, which negatively affects service providers wishing to retain customers.

SUMMARY

This summary is provided to introduce simplified concepts of cloud-based movable-component binding. The simplified concepts are further described below in the Detailed Description. This summary is not intended to identify essential features of the claimed subject matter, nor is it intended for use in determining the scope of the claimed subject matter. The term "tools," for example, may refer to systems, methods, computer-readable media, and/or techniques, as appropriate in context.

This document describes tools capable of enabling cloud-based movable-component binding. The tools, in some embodiments, bind protected media content to a movable component in a mobile computing device in a cryptographically secure manner without requiring the movable component to perform a complex cryptographic function. By so doing the mobile computing device may request access to content and receive permission to use the content quickly and in a cryptographically robust way.

BRIEF DESCRIPTION OF THE DRAWINGS

Embodiments of cloud-based movable-component binding are described with reference to the following drawings. The same numbers are used throughout the drawings to reference like features and components.

DETAILED DESCRIPTION

Overview

Embodiments of cloud-based movable-component binding provide techniques to manage the rights and restrictions associated with a digital rights management (DRM) license for protected and/or licensed media content. As described herein, protected media content can include any type of media content that is purchased, downloaded, or otherwise obtained, such as music, a movie, an application, a game, and other media content that is subject to a DRM license to protect it from unauthorized sharing, copying, and/or distribution.

In an example DRM system, various devices can be implemented to perform actions on protected media content as permitted by a DRM license. A device can include any type of portable communication device, music device, television client device, a gaming system, and the like which can perform actions such as to render, playback, copy, print, execute, consume, and/or other actions on the protected media content. The DRM license provides the rights and restrictions of the actions performed on the protected media content.

In the DRM system, a first device can include a movable component that is a token associated with a DRM license for the system. For example, the movable component of the device may include a Subscriber Identity Module (SIM) card or similar component that is the hardware token associated with the DRM license for the device. The first device can also include a removable memory card that stores protected media content on which the first device can perform actions as permitted by the DRM license. The movable component (e.g., the token that is associated with the DRM license) and the removable memory card can be removed from the first device and installed in a second device such that the second device can perform the actions on the protected media content as permitted by the DRM license. In one embodiment, the movable component and the removable memory card are a combined component such that the removable memory card is the token associated with the DRM license.

In another example DRM system, a domain can include multiple devices that each has a private key that is common to the domain. The domain can also include unique certificates associated with a DRM license for each of the multiple devices of the domain. In addition, protected media content can also be bound to the domain such that a device that is a member of the domain having the domain private key and a unique certificate can perform actions on the protected media content that is bound to the domain. For example, a removable memory card that stores protected media content in a first device of the domain can be moved to a second device of the domain and the second device can perform actions on the protected media content if the second device also has a movable component that is associated with the DRM license for the domain.

In another embodiment, a first device of the domain in the DRM system can include a movable component that corresponds to a first unique certificate that is associated with the DRM license for the system. For example, the movable component can be a movable component, a SIM card, or other device token. A second device of the domain can also include a movable component that corresponds to a second unique certificate that is associated with the DRM license for the system. The first device of the domain can include a removable memory card to store protected media content on which the device can perform actions as permitted by the DRM license. The removable memory card can then be removed from the first device and installed in the second device such that the second device can perform the actions on the protected media content as permitted by the DRM license that is associated with the movable component in the second device. In an embodiment, each of the unique certificates for the multiple devices include identifiers corresponding to the movable components that are the tokens associated with the DRM license for the multiple devices.

Whether the movable component is moved or otherwise, it is capable of moving and is usable to bind the protected media content on the device. The movable component, for example, may be one that is not capable of quickly performing cryptographically complex functions, such as asymmetric key operations. Current movable components, such as SIMs, for example, may take seconds or even minutes to perform these and similar complex cryptographic functions. Doing so may delay the mobile computing device from gaining permission to use protected media content, which may irritate a user of the mobile computing device.

In one embodiment, the tools request a cryptographically secure identifier bound to a movable component, receive such identifier, and, using that identifier request permission to use content through a mobile-device communications network and from a computationally fast device (e.g., a server). In so doing the tools trade, in a sense, the slow computational power of the movable component for a fast communication speed with the computationally fast device through the mobile-device communications network. This embodiment of the tools assumes that the computationally fast device may perform complex cryptographic functions at a small fraction of the time it would take the movable component to do so. In some cases the tools enable permission to be received more quickly by requesting permission from a cloud-based entity (e.g., a remote server) than from a movable component while still binding the use of the content to the movable component.

While features and concepts of the tools for cloud-based movable-component binding can be implemented in any number of different environments, systems, and/or various configurations, embodiments of cloud-based movable-component binding are described in the context of the following example systems and environments.

Example Environments and Embodiments

Figure 1:
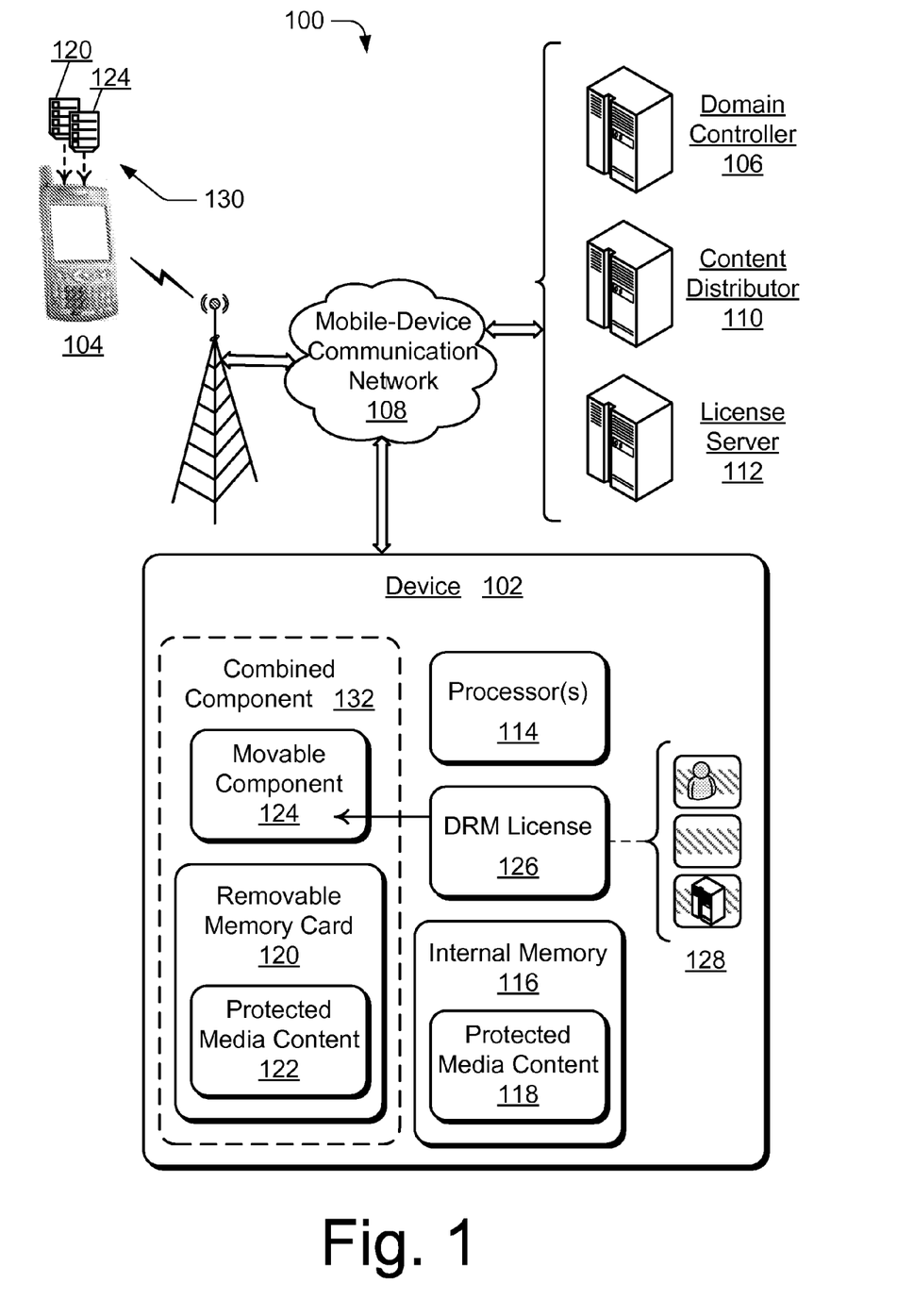
FIG. 1 illustrates an example digital rights management (DRM) system in which embodiments of cloud-based movable-component binding can be implemented.

FIG. 1 illustrates an example digital rights management (DRM) system 100 in which various embodiments of cloud-based movable-component binding can be implemented. In this example, system 100 includes device 102 and device 104 that are each implemented to communicate with a domain controller 106 via a mobile-device communication network 108. The example system 100 also includes a content distributor 110 of protected media content, and includes a license server 112.

The mobile-device communication network 108 can be implemented as part of a media content distribution system and/or DRM system using any type of network topology and/or communication protocol, and can be represented or otherwise implemented as a combination of two or more networks. For example, the communication network 108 may include any suitable wired and/or wireless network(s) that allow device 102 and/or device 104 to communicate with a variety of entities to facilitate the distribution and/or protection of media content. Device 102 and device 104 can communicate with each other as well as with the domain controller 106, content distributor 110, and license server 112 via the communication network 108.

Any of the devices, such as device 102 in the DRM system 100, can be implemented as any one or combination of a mobile computing device having communication capabilities, such as a mobile television device, mobile music device, gaming system, cellular phone, portable computer, and appliance device. In various embodiments, the devices can be implemented with any number and combination of differing components, such as a DRM platform, as further described with reference to the example device shown in FIG. 4. A device 102 or 104 may also be associated with a user (i.e., a person or group of persons) and/or an entity that operates the device such that a "device" describes logical devices that may include users, software, and/or other components.

In this example, device 102 in the DRM system 100 includes one or more processor(s) 114 (e.g., any of microprocessors, controllers, and the like) that process various computer-executable instructions to control the operation of the device, to communicate with other electronic and computing devices, and to implement embodiments of cloud-based movable-component binding. Device 102 can optionally include an internal memory 116 to store protected media content 118 (e.g., DRM protected media content, for example), and has the capability to host a removable memory card 120 to store protected media content 122. The protected media content 118 and/or 122 can include any type of media content that is purchased, downloaded, or otherwise obtained, such as music, a movie, an application, a game, pictures, a video clip, and the like. The content distributor 110 can provide the protected media content 118 and 122 to device 102 via the communication network 108.

Device 102 also includes a movable component 124 that is associated with a DRM license 126 (e.g., the DRM license is cryptographically bound to the movable component 124). In an embodiment, the movable component 124 is a token of the device 102, and the DRM license 126 is cryptographically bound to the token of the device. The movable component 124 can be implemented as a flash card, a Subscriber Identity Module (SIM) card, a smart card, and/or any other type of token of the device 102 that is associated with the DRM license 126. The movable component 124 can include a USIM (User Subscriber Identity Module), which is a logical entity on the card to store subscriber and/or authentication information. For example, the DRM license 126 may have various, associated license identifiers 128 such as a customer identifier, service identifier, and/or a domain identifier that, in any combination, authenticate the device to the domain controller 106 and/or to the license server 112 of the DRM system 100. The various, associated license identifiers 128 provide multiple playback criteria for determination whether a device can perform actions on the protected media content as permitted by the DRM license 126.

The movable component 124, in one embodiment, stores a unique secret key and nonce (e.g., a random number or a "number once" value), increment the nonce value, and perform symmetric key operations. The movable component 124 may be capable of performing other operations, such as asymmetric key operations, though doing so may take considerably more time than performing a symmetric key operation.

The domain controller 106 manages device membership in a domain and issues domain certificates and private keys to devices that are members of the domain, either directly or indirectly through the license sever 112. The license server 112 issues the DRM license 126, which provisions the rights and restrictions of actions performed on the protected media content 118 and/or 122. In an implementation, the domain controller 106 and the license server 112 can be managed by separate entities, or can be implemented together in a domain. Although the domain controller 106, content distributor 110, and license server 112 are described as distributed, independent components of the DRM system 100, any one or more of the controller(s), distributor(s), and server(s) can be implemented together as a multi-functional component or entity of the system. In various implementations, domain membership can also be managed by a network operator, a third party entity, or by a user.

When device 102 includes protected media content, such as protected media content 118 and/or 122, and the movable component 124 is installed, the device 102 can perform actions on and otherwise use the protected media content as permitted by the DRM license 126 once permission is received from a cloud-based entity, such as the license server 112. The DRM license 126 provides the rights and restrictions of the actions performed on the protected media content, such as to render, playback, copy, print, execute, consume, and/or other actions on the protected media content. In an alternate embodiment, such as described with reference to the DRM system shown in FIG. 2, a domain can include a set of movable components that are associated with the domain certificates such that any of the movable components can be implemented as the basis to perform actions on the protected media content without the need to change the DRM license 126. In addition, the domain controller 106 can update the domain certificates to add and/or remove a subset of the movable components from the set of components that can be used with DRM license 126.

In the example system 100, the DRM license 126 can be moved from one device to another along with the movable component 124. For example, a user may remove the movable component 124 and the removable memory card 120 from device 102 and install them (at 130) in device 104. When the movable component 124 and the removable memory card 120 with the protected media content 122 are installed in device 104, the device can then perform the actions on the protected media content 122 as permitted by the DRM license 126, again after permission is received from a cloud-based entity.

In an alternate embodiment of device 102, the movable component 124 and the removable memory card 120 can be a combined component 132 such that the removable memory card 120 is the token that is associated with the DRM license 126 (e.g., the DRM license is cryptographically bound to the removable memory card 120) for device 102. The DRM license 126 can then be removed from device 102 along with the combined component 132 and installed in device 104.

A user, for example, may acquire a new phone (e.g., device 104), remove the SIM (e.g., movable component 124) and flash card (e.g., removable memory card 120) from the old phone (e.g., device 102), and insert the SIM and flash card into the new phone. When the new phone is turned on, it can gain permission to use the protected media content 122 according to method(s) illustrated in FIGS. 3 and/or 5 and 6.

In an embodiment, the new device can be set up to join a domain utilizing the domain protocol and without user interaction. As a result of joining the domain, the device receives a domain certificate and associated private key bound to the device. Once permission is received from a cloud-based device using a cryptographically secure identifier bound to the movable component, the new device will be able to play any previously acquired content using a domain private key, which enables the device to extract content keys from the domain-bound licenses and decrypt the content.

Figure 2:
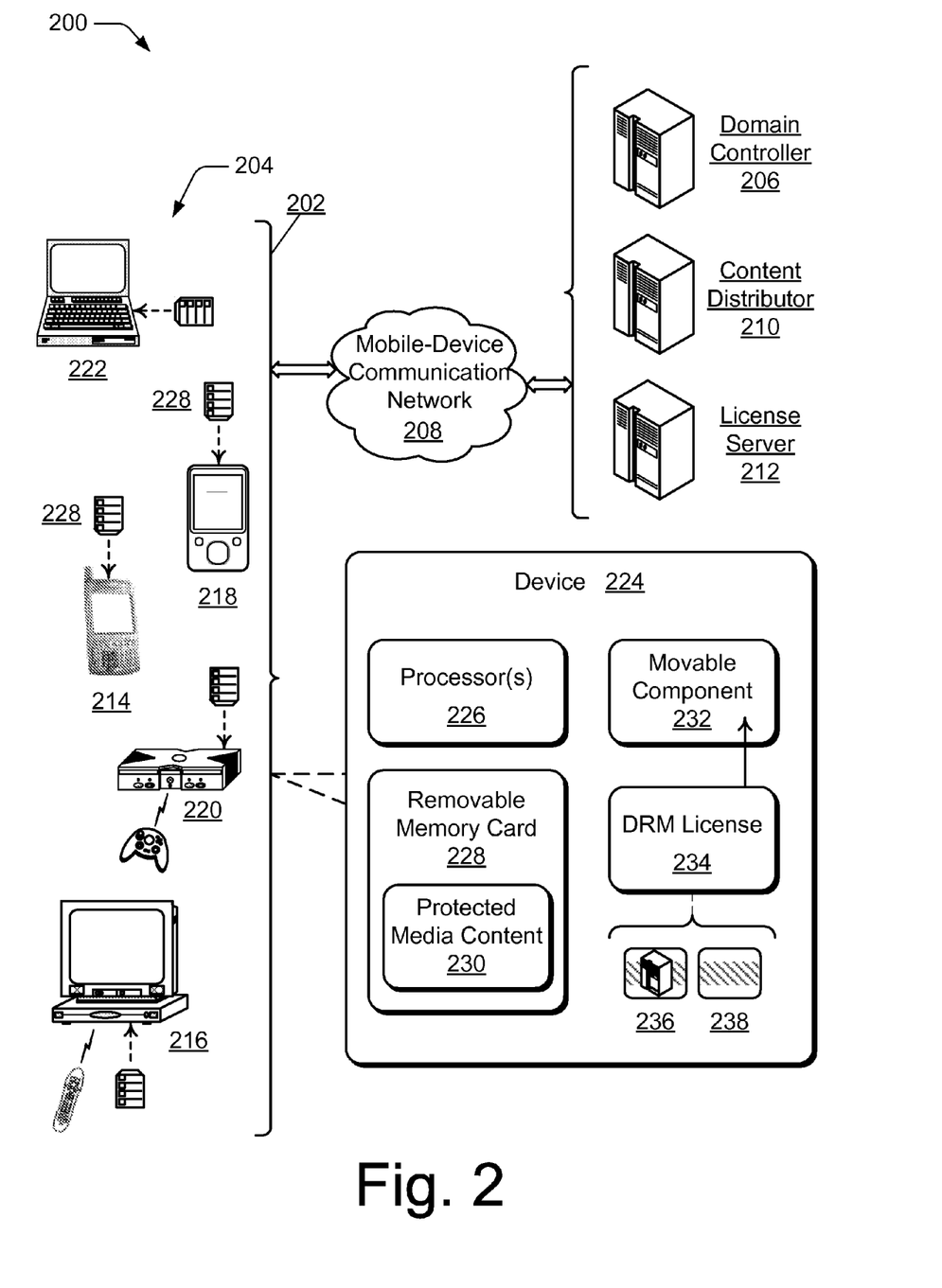
FIG. 2 illustrates another example DRM system in which embodiments of cloud-based movable-component binding can be implemented.

The movable component 124 may include a secret. This secret is cryptographically bound to the movable component 124 (e.g., in hardware or software). In one embodiment, the secret is provisioned into the movable component (124 or 232) through a secure channel and using a remote entity (e.g., license server 112 or 212). The movable component 124 may also generate a random number, e.g., a nonce, and on subsequent communications increment that nonce. The movable component is also capable of providing a cryptographically secure identifier, which here is a strong symmetric key operation performed on the nonce using the secret. This may be represented mathematically as:

$$\{Nonce\}SK$$

Where SK is the secret key, Nonce is a random number or increment of that number, and the function is a strong symmetric key operation.

FIG. 2 illustrates another example digital rights management (DRM) system 200 in which various embodiments of cloud-based movable-component binding can be implemented. In this example, system 200 includes a domain 202 that includes multiple devices 204 that are registered to the domain and implemented to communicate with a domain controller 206 via a mobile-device communication network 208. The example system 200 also includes a content distributor 210 of protected media content, and a license server 212 that the multiple devices 204 are implemented to communicate with via the communication network 208. The multiple devices 204 of the domain 202 may correspond to one user or to several different users. An example of communication network 208 is described above with reference to communication network 108 shown in FIG. 1.

The multiple devices 204 that are registered to the domain 202 can be implemented as any one or combination of a portable communication device 214 (e.g., cellular phone), television client device 216, music device 218, a gaming system 220, or as any other computing-based device 222, such as a desktop computer, a portable computer, or an appliance device.

In various embodiments, the devices can be implemented with any number and combination of differing components, such as a DRM platform, as further described with reference to the example device shown in FIG. 4. Any of the multiple devices may also be associated with a user (i.e., a person or persons) and/or an entity that operates the device such that a "device" describes logical devices that may include users, software, and/or other components.

An example device 224 is representative of any of the multiple devices 204 that are registered to the domain 202. The example device 224 includes one or more processor(s) 226 (e.g., any of microprocessors, controllers, and the like), which process various computer-executable instructions to control the operation of the device, to communicate with other electronic and computing devices, and to implement embodiments of cloud-based movable-component binding.

Example device 224 also includes a removable memory card 228 to store protected media content 230. As described previously, protected media content can include any type of media content that is purchased, downloaded, or otherwise obtained, such as music, a movie, an application, a game, pictures, a video clip, and the like. The content distributor 210 can provide the protected media content 230 to the multiple devices 204 of the domain 202 via the communication network 208.

The example device 224 also includes a movable component 232 that is a token of the device 224 and is associated with a DRM license 234 (e.g., the DRM license is cryptographically bound to the movable component 232). The movable component 232 can be implemented as a movable component, a flash card, a Subscriber Identity Module (SIM) card that is associated with the DRM license, as a smart card, and/or as any other type of token of the example device 224.

The movable component in this example is capable of providing a cryptographically secure identifier of the component usable by the domain controller 206 or the license server 212 of the DRM system 200 to authenticate the movable component 232 and correspondingly a right or lack thereof to use the protected media content 230 on the device 224.

In an embodiment, the domain 202 includes a domain private key that is common to the domain, and includes unique certificates that are associated with a DRM license for each of the multiple devices 204 that are registered to the domain 202. For example, the DRM license 234 for device 224 has an associated domain private key 236 that is common to the domain 202, and has a unique certificate 238. In addition, each of the unique certificates for the multiple devices of the domain 202 include identifiers that correspond to the movable components, which are the tokens associated with the DRM license for the multiple devices.

In the system 200, a user may remove the removable memory card 228 and the movable component 232 from one device 214 of the domain 202 and install the removable memory card 228 and the movable component 232 in another device 218 of the domain. When these are installed, the device 218 can then perform the actions on the protected media content 230 as permitted by the DRM license for the particular device according to one or more of methods 300, 500, and 600.

Generally, the tools includes any of the functions, methods, and modules described herein and can be implemented using hardware, software, firmware (e.g., fixed logic circuitry), manual processing, or any combination thereof. A software implementation of a function, method, or module represents program code that performs specified tasks when executed on a computing-based processor. Example method 300 described with reference to FIG. 3 may be described in the general context of computer-executable instructions. Generally, computer-executable instructions can include applications, routines, programs, objects, components, data structures, procedures, modules, functions, and the like that perform particular functions or implement particular abstract data types.

The method(s) may also be practiced in a distributed computing environment where functions are performed by remote processing devices that are linked through a communications network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
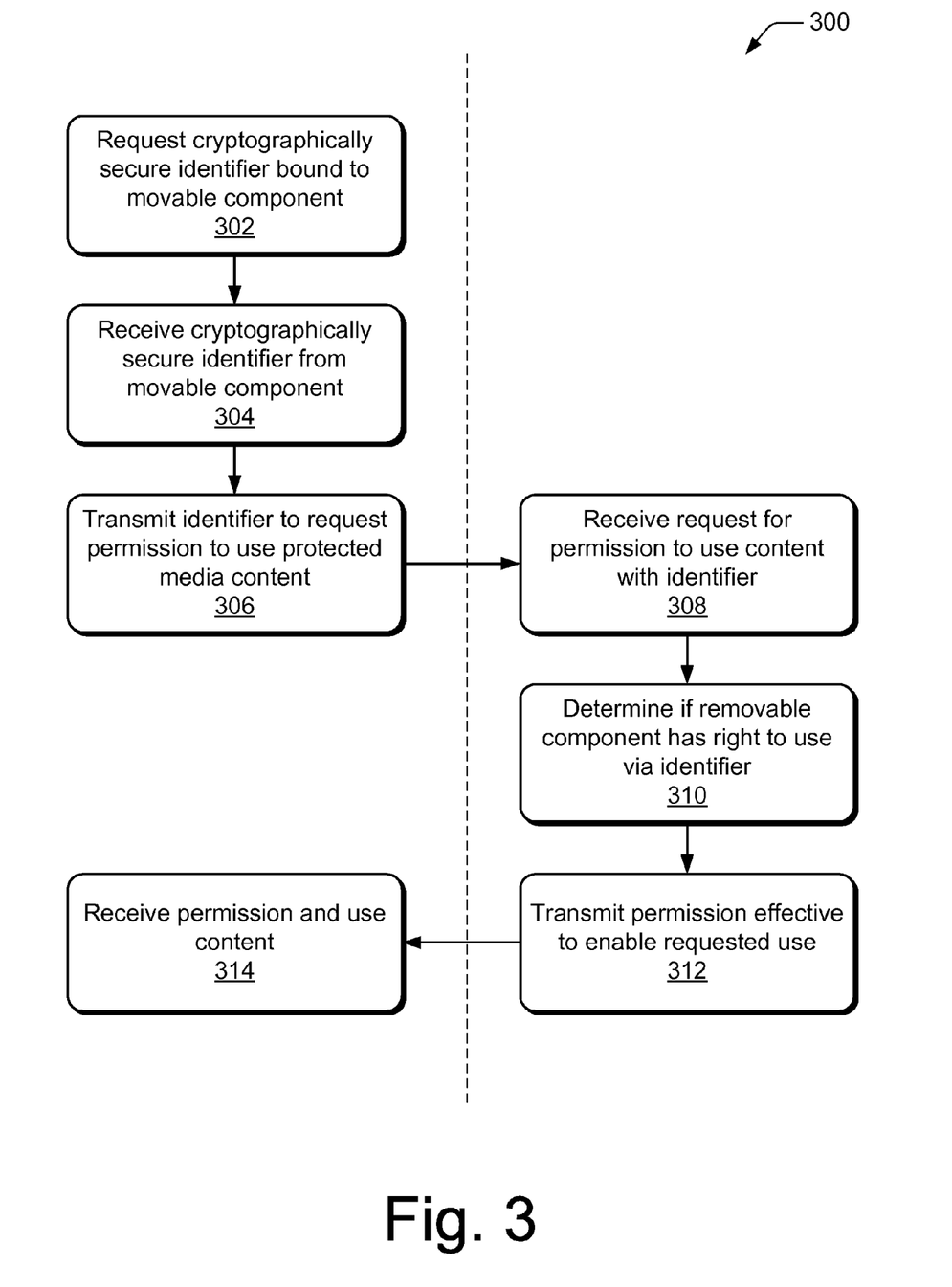
FIG. 3 illustrates example method(s) for embodiments of cloud-based movable-component binding.
Figure 5:
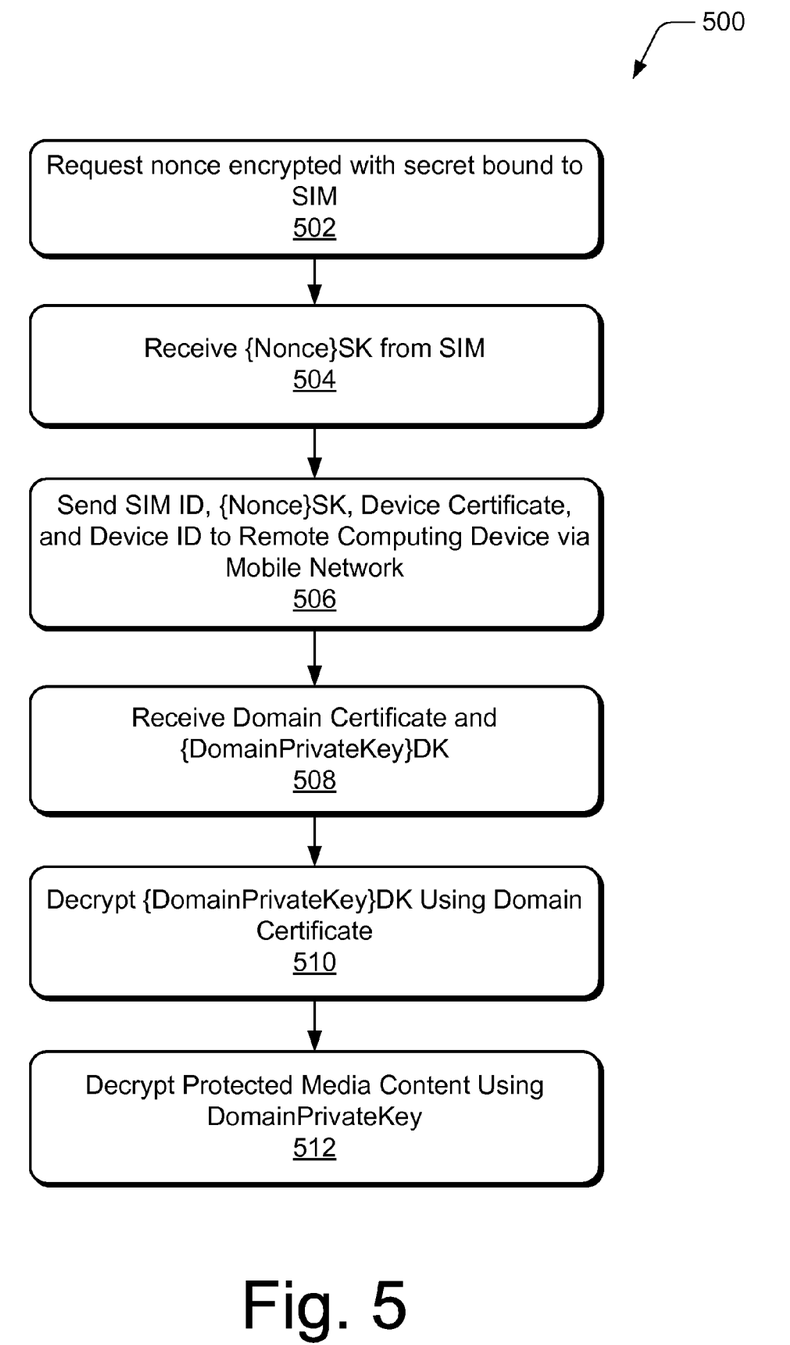
FIG. 5 illustrates example method(s) for embodiments of cloud-based movable-component binding that act through a mobile computing device.
Figure 6:
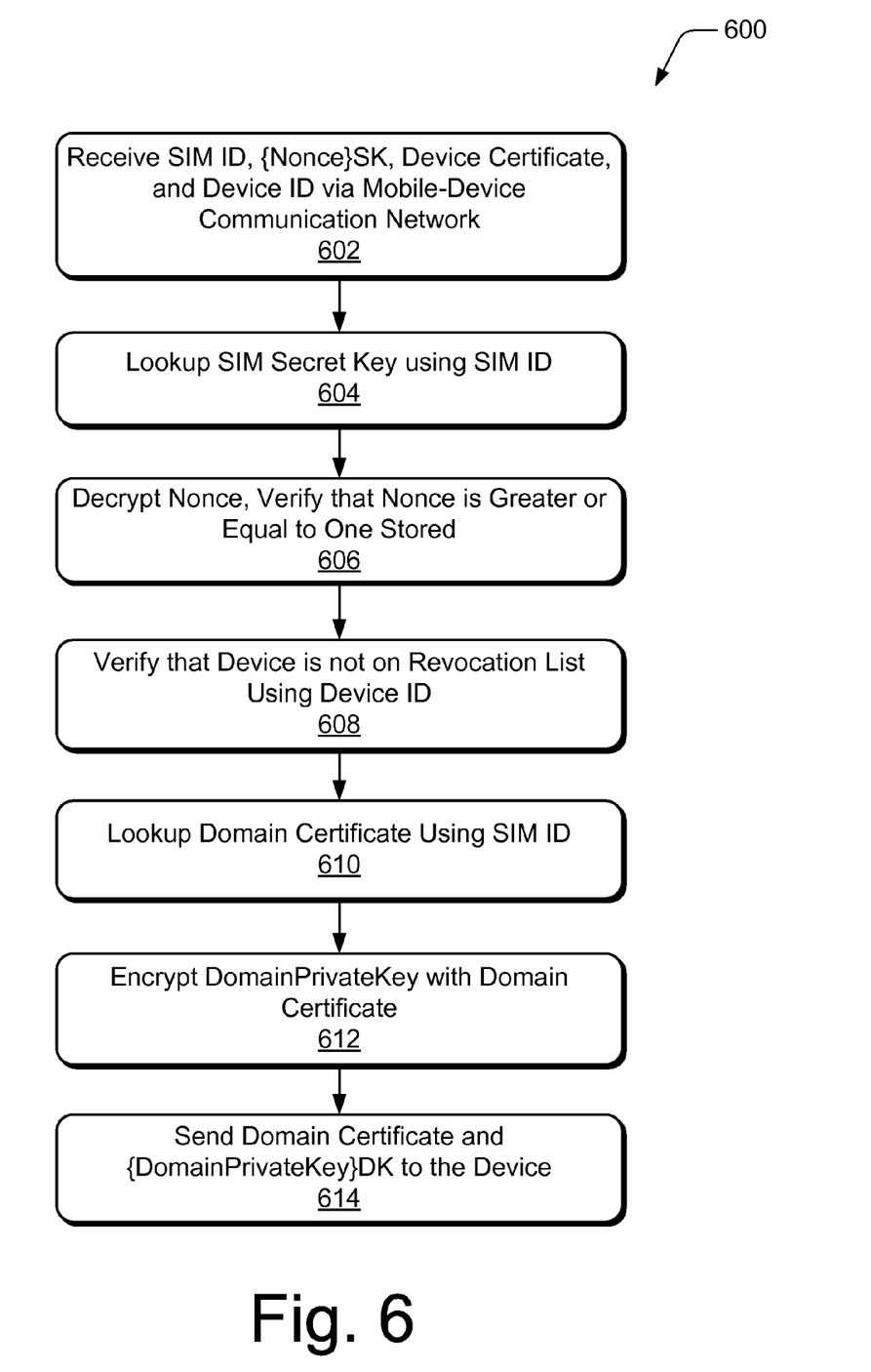
FIG. 6 illustrates example method(s) for embodiments of cloud-based movable-component binding that act through a remote computing device accessed through a mobile-device communications network.

FIGS. 3, 5, and 6 illustrate example method(s) of cloud-based movable-component binding. The order in which a method is described is not intended to be construed as a limitation, and any number of the described method blocks can be combined in any order to implement the method, or an alternate method.

Example Method

FIG. 3 illustrates a method 300 performed by a mobile computing device (e.g., the device 102 of FIG. 1) and a remote computing device (e.g., the license server 112 of FIG. 1) communicated with over a mobile-device communication network (e.g., the mobile-device communication network 108 of FIG. 1), the communication show as arrows over the dashed line in FIG. 3. FIGS. 5 and 6 illustrate other methods providing, in some cases, additional detail and directed to actions either of a mobile computing device (FIG. 5) or an entity communicated with over a mobile-device communication network (FIG. 6).

Block 302 requests, from a movable component physically connected to the mobile computing device but removable from the mobile computing device, a cryptographically secure identifier bound to the movable component, identifying the movable component, and not decryptable by the mobile computing device but decryptable by a remote computing device capable of communication with the mobile computing device using a mobile-device communication network. In one embodiment a device 102 requests such an identifier from movable component 124.

Block 304 receives the cryptographically secure identifier from the movable component. Continuing the ongoing embodiment, the device 102 receives the identifier from the movable component 124. The cryptographically secure identifier may, in some cases, be computed by the movable component with a symmetric key operation using a secret bound to the movable component and known by the remote computing device. As noted above, the movable component may be capable of performing a strong symmetric key operation on a random number or an increment of that number using a secret. This secret may be hardware or software bound to the movable component. Also as noted, it may be provisioned through the mobile-device communication network 108 by the license server 112 or some other device accessible through the mobile-device communication network.

Block 306 transmits the cryptographically secure identifier to the remote computing device over the mobile-device communication network to request permission to use protected media content, the cryptographically secure identifier usable by the remote computing device to determine that the movable component is authentic and a user associated with the movable component has a right to the requested use of the protected media content. Continuing the ongoing embodiment, the mobile computing device requests permission, via a mobile-device communication network and from a remote device capable of performing complex cryptographic functions quickly relative to the movable component 124, to use protected media content and with the cryptographically secure identifier.

Block 306 may also, in some embodiments, transmit a non-encrypted identifier for the movable component effective to enable the remote computing device to authenticate the movable component using the cryptographically secure identifier and the non-encrypted identifier. In this case the non-encrypted identifier may save the remote computing device from guessing with which movable component the cryptographically secure identifier is associated, which may also save the remote computing device from attempting to decrypt the cryptographically secure identifier with a secret associated with some other movable component known to the remote device.

Block 308 receives, via the mobile-device communication network and from the mobile computing device, the request to use the protected media content and the cryptographically secure identifier. Continuing the ongoing embodiment, the license server 112 receives a request to use protected media content with an identifier for the device 124, an identifier for the license 126 or protected media content at issue (e.g., protected media content 122), and the cryptographically secure identifier for the movable component 124.

Block 310 determines, based on the cryptographically secure identifier, that the movable component is authentic and that an entity associated with the movable component has a right to the requested use of the protected media content. The tools determine if the movable component is one associated with an entity (e.g., a user, group of users, device, or group of devices) having a right to use the protected media content as requested. Thus, in this embodiment the license server 112 may receive the cryptographically secure identifier through the mobile-device communication network 108 and from the device 102, as well as other identifiers by which the license server 112 may determine if the device 102 has been revoked (e.g., is a device that is not trusted to use content), and the license pertaining to the content at issue.

Note that at this point the movable component 124 may have performed a strong symmetric key operation using a secret shared with the license server 112 and of a nonce value. The license server 112 may receive this identifier, decrypt the identifier with the secret to find the nonce, and thereby determine if the movable component is trusted. If trusted, it may then determine if the device is trusted and, if both are trusted, whether the license permits the requested use.

Note also that the movable component performed a relatively quick function to provide this cryptographically secure identifier. The movable component did not need to perform complex and/or time-consumer functions like asymmetric key operations. Because it did not do this type of operation, the mobile computing device asks that the server perform a complex function. In a sense this trades slow computational speed of the movable component with both speed of communication through the mobile-device communication network and speed of the license server 112. The license server 112 is capable of performing computations quickly relative to the movable component, such as to decrypt the identifier and provide information to the device by which the device may decrypt the protected media content at issue. Also, the mobile-device communication network 108 is capable of communicating the request and the response quickly, also relative to the computation speed of the movable component 124.

The communication time of the request and response can be referred to as: $t_c$. The time taken by the license sever 112 to receive the request, verify appropriately, and respond can be referred to as: $t_{ls}$. The time taken by the movable component to receive the request for the identifier, compute the identifier, and provide it back can be referred to as: $t_{ID}$. As shown below, these may all be less time than were the movable device to instead receive a request requiring computation of an asymmetric key operation, performing that operation, and providing the results to the mobile computing device (in total: $T_{encrypt}$). Thus, this particular protocol in this example may be represented as:

$$t_{ID}+t_c+t_{ls}<T_{encrypt}$$

This time advantage is not required by the tools, as the tools may have value outside of this timing gain, such as when a movable component is not capable of performing or is not desired to perform complex cryptographic functions.

This time advantage, however, may improve a user's experience. The user may wait less time when asking their device to play a music video, for example, than were the user's device's movable component to have to perform complex cryptographic functions.

Block 310 may also determine whether or not the mobile computing device is trusted prior to performing block 312. The tools may do so, in one embodiment, by receiving a device identifier identifying the mobile computing device (e.g., in the request from the mobile computing device), comparing that device identifier to a revocation list, and determining that the mobile computing device is trusted if the device identifier is not on that list.

Block 312 transmits information to the mobile computing device via the mobile-device communication network, the information sufficient to enable the mobile computing device to use the protected media content. The license server 112, for example, may provide cryptographic information enabling the mobile computing device 102 to decrypt the protected media content 122.

This information may include a key usable by the mobile computing device to decrypt the protected media content, examples of which are described in greater detail in method(s) 500 and/or 600.

Block 314 receives, in response to the act of transmitting the cryptographically secure identifier and from the remote computing device over the mobile computing device communication network, permission to use the protected media content. Block 314 may also use the content as requested.

In the ongoing embodiment, the mobile computing device 102 receives the permission over the mobile-device communications network 108 from the license server 112, decrypts the protected content 122, and then uses the content. Assume, for example, that a user requested to play a music video on a cellular phone. The cellular phone, usually quickly and with little or no interruption noticeable to the user, plays the music video. The cellular phone has been given permission to do so by an entity on the cloud based on the movable component being verified and determining that an entity associated with that movable component has the requested right.

This discussion now turns to an example device and movable component, after which two example methods are described in the context of this example device and movable component.

Example Mobile Computing Device and Movable Component

Figure 4:
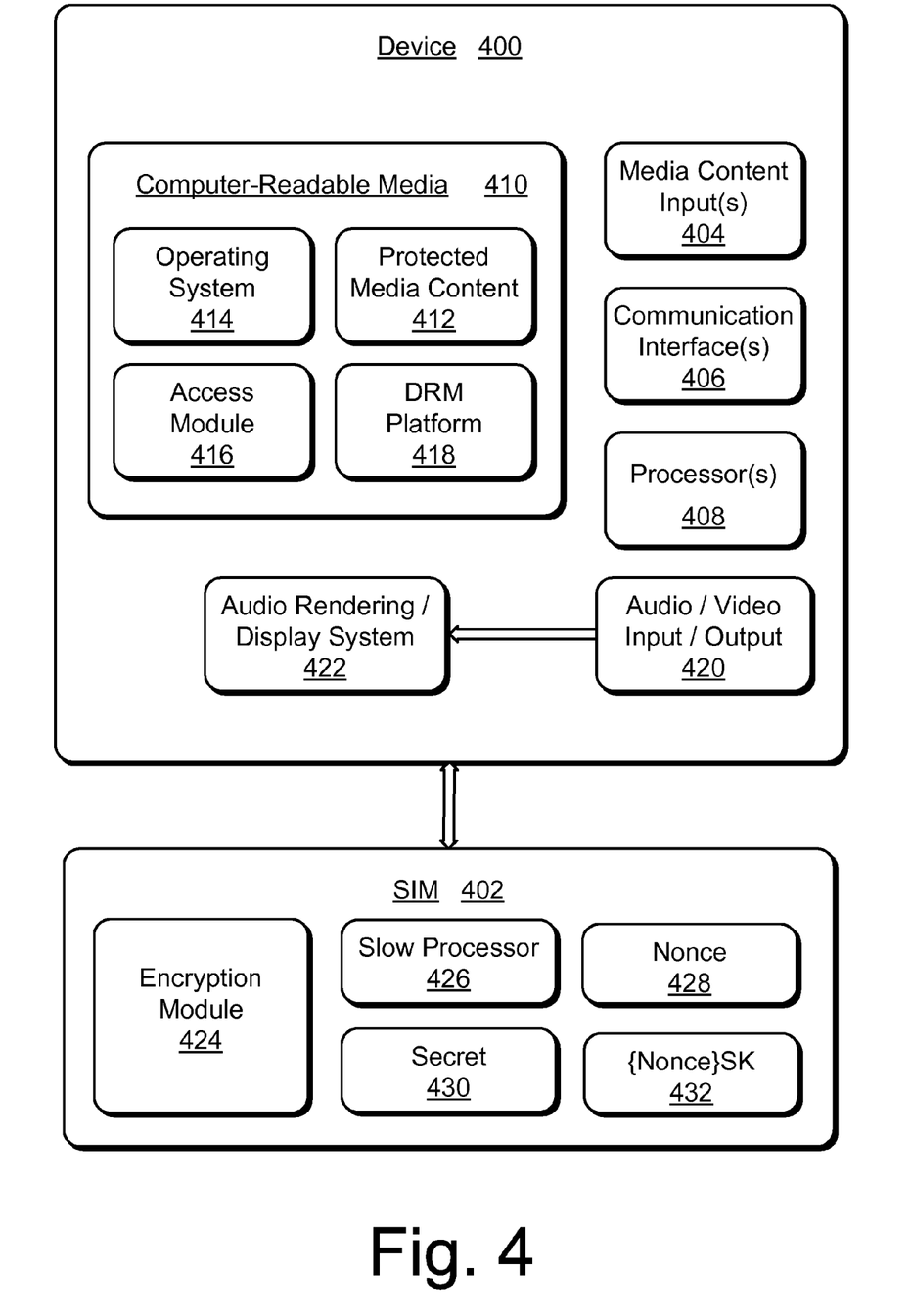
FIG. 4 illustrates various components of an example device that can be implemented in a DRM system.

FIG. 4 illustrates various components of an example device 400 and a SIM type of movable component 402. The device 400 can be implemented in various embodiments as one or combination of a computing, electronic, portable, gaming, appliance, client device, or any other type of device to implement embodiments of cloud-based movable-component binding. For example, device 400 can be implemented as device 102 shown in FIG. 1, or as any of the various devices 204 shown in FIG. 2. The SIM 402 can be implemented in these embodiments as well, in one example being a removable hardware-card type of SIM pluggable and removable from a cellular phone type of mobile computing device.

Device 400 includes one or more media content inputs 404 via which media content (e.g., licensed media content, protected media content, DRM media content, etc.) is received via a communication network. Device 400 further includes communication interface(s) 406 that can be implemented as any one or more of a serial and/or parallel interface, a wireless interface, any type of network interface, a modem, and as any other type of communication interface. A network interface provides a connection between device 400 and a communication network by which other electronic and computing devices can communicate data with device 400.

Similarly, a serial and/or parallel interface provides for data communication directly between device 400 and the other electronic or computing devices. A modem also facilitates communication with other electronic and computing devices via a conventional telephone line, a DSL connection, cable, and/or other type of connection. A wireless interface enables device 400 to receive data and content from a wireless communication network and/or input device.

Device 400 also includes one or more processor(s) 408 (e.g., any of microprocessors, controllers, and the like), which process various computer-executable instructions to control the operation of device 400, to communicate with other electronic and computing devices, and to implement embodiments of cloud-based movable-component binding. Device 400 can be implemented with computer-readable media 410, such as one or more memory storage components, examples of which include a removable card, random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 410 provides data storage mechanisms to store protected media content 412 as well as other information and/or data such as software applications and any other types of information and data related to operational aspects of device 400. For example, an operating system 414, an access module 416, and a DRM platform 418 can be maintained as software applications with the computer-readable media 410 and executed on processor(s) 408 to implement embodiments of cloud-based movable-component binding. The access module 416 can be implemented capable of communicating with SIM 402 and a remote computing device over a mobile-device communications network effective to enable cloud-based movable-component binding.

The DRM platform 418 can be implemented as a component of the device and configured to implement the DRM techniques described herein.

Device 400 also includes an audio and/or video output 420 that provides audio and/or video data to an audio rendering and/or display system 422. The audio rendering and/or display system 422 can include any devices that process, display, and/or otherwise render audio, video, and image data. The audio rendering and/or display system 422 can be implemented as integrated components of the example device 400, or as separate components.

Device 400 communicates with SIM 402, which here is a movable component made up of a SIM card, such as a small, pluggable smart card. The SIM 402 includes encryption module 424, which provides instructions executable on a slow processor 426. The slow processor 426 is slow relative to license server 112 of FIG. 1 and other highly capable computing devices. The encryption module 424 and the slow processor 426, however, are capable of generating a nonce 428 and performing a symmetric key operation on the nonce 428 using a secret 430 to provide a cryptographically secure identifier, here indicated as "{Nonce}SK" 432. The SIM 402 is also capable of retaining the secret 430.

Example Method of Example Device and Movable Component

Turning to FIG. 5, a method 500 illustrates example actions of a mobile computing device that, in conjunction with actions of other devices, enable cloud-based movable-component binding. This example method provides but one example of ways in which the tools may enable cloud-based movable-component binding; others manners are contemplated by the tools and this document. One or more of the blocks of method 500, for example, may be an implementation of one or more of blocks 302, 304, 306, or 314. FIG. 5 will be described using the device 400 and the SIM type of movable component (SIM 402) of FIG. 4, though other devices and movable components may also be used, such as devices 102 and 224 and movable components 124 and 232.

Block 502 requests a nonce encrypted with a secret, the secret bound to a SIM. Access module 416 of device 400 of FIG. 4 requests, from the SIM 402, a cryptographically secure encryption of a random number using a secret known by the SIM 402 but not the device 400. Here the SIM 402 may provide this cryptographically secure encryption by encrypting, with a symmetric key operation, the nonce 428 with the secret 430 to provide {Nonce}SK 432. The SIM 402 performs this symmetric key operation using the encryption module 424, which generates instructions performed on the slow processor 426. Note that the nonce 428 may be incremented, such as when this is not the first nonce generated by the SIM 402.

Block 504 receives the nonce encrypted with the secret from SIM 402, here indicated as {Nonce}SK 432 of FIG. 4. The device 400 may also receive, or have retained from other sources or a prior communication with the SIM 402, an identifier for the SIM 402.

Block 506 sends the SIM identifier, the {Nonce}SK 428, and the device's own device certificate and device identifier to a remote computing device via a mobile-device communication network. Here the device 400 sends this information over mobile-device communication network 208 to the license server 212 (both of FIG. 2) as part of a request to play protected media content, such as the protected media content 412. The device 400 makes this request at block 506, as well has requesting and receiving of blocks 502 and 504, respectively, using the access module 416 as well as other components of the device 400.

Block 508 receives a domain certificate and a domain private key encrypted with a domain key. As will be discussed in FIG. 6 and as was discussed in FIG. 3 at blocks 308, 310, and 312, this certificate and encrypted domain private key are sufficient for the device to decrypt and use the protected media content at issue. Here this information is received over the mobile-device communications network 208 from the license server 212, both of FIG. 2.

Block 510 decrypts the {DomanPrivateKey}DK using the received domain certificate, which results in an unencrypted DomainPrivateKey. Block 512 decrypts the requested, protected media content using the DomainPrivateKey. These two decryptions may be performed by the access module 416.

Example Method of Remote Computing Device

Turning to FIG. 6, a method 600 illustrates example actions of a remote computing device that is remote from a mobile computing device and that, in conjunction with actions of the mobile computing device, enables cloud-based movable-component binding. This example method provides but one example of ways in which the tools may enable cloud-based movable-component binding; others manners are contemplated by the tools and this document. One or more of the blocks of method 600, for example, may be an implementation of one or more of blocks 308, 310, or 312. FIG. 6 will be described using an example remote computing device, here the license server 212 of FIG. 2, though other devices may also be used, such as the license server 112 of FIG. 1.

Block 602 receives a SIM identifier, a {Nonce}SK, a device certificate, and a device identifier via a mobile-device communication network. In this example embodiment, the license server 212 receives this information, and then looks up the SIM secret key and a stored nonce using the SIM identifier, at block 604.

Using the SIM secret key retained by the license server 212, the tools at block 606 decrypt the {Nonce}SK 428 to determine a number (the decrypted Nonce) and, if the number matches or is an increment more than the nonce stored at the license sever 212, the license server 212 determines that the SIM card from which the {Nonce}SK 428 is presumed to have been sent indirectly through the mobile computing device is legitimate. If the SIM 402 is trusted based on the nonce found (and the license associated with the SIM 402 permits the requested use), the license sever 212 may permit the use, depending on the results of performing blocks 608 to 612.

Block 608 verifies that the device is not on a revocation list or is otherwise trusted. The license server 212 may do so using the received device identifier and device certificate.

Block 610 looks up a domain certificate associated with the device based on the SIM identifier. The tools, at block 612, may then encrypt the domain private key ("DomainPrivateKey") using a device certificate. The tools, at block 614, send this domain certificate and {DomainPrivateKey}DK to the device that requested to use the protected media content. Thus, the license server 212 performs various cryptographic functions to determine if a user has the rights requested based on a movable component and without requiring the movable component to perform complex computations, such as asymmetric key operations. These operations are instead performed by a fast remote computing device, here the license server 212.

Methods 500 and 600 may work together to enable cloud-based movable-component binding, in this example enabling secure use of protected media content bound to the SIM 402 without requiring the SIM 402 to perform computations that are often slow and/or require the SIM 402 to have computational abilities above that of performing a symmetric key operation.

Conclusion

Although embodiments of cloud-based movable-component binding have been described in language specific to features and/or methods, it is to be understood that the subject of the appended claims is not necessarily limited to the specific features or methods described. Rather, the specific features and methods are disclosed as example implementations of cloud-based movable-component binding.

The invention claimed is:

1. One or more computer-readable storage devices having computer-executable instructions that, when executed by one or more processors on a mobile computing device, perform acts comprising:

requesting, from a movable component physically connected to the mobile computing device but removable from the mobile computing device, a cryptographically secure identifier bound to the movable component, identifying the movable component, and not decryptable by the mobile computing device but decryptable by a remote computing device capable of communication with the mobile computing device using a mobile-device communication network, the movable component comprising a token associated with a DRM license, the DRM license permitting the mobile computing device to perform actions on protected media content that is stored on a removable memory physically connected to the mobile computing device but removable from the mobile computing device;

receiving the cryptographically secure identifier from the movable component;

transmitting the cryptographically secure identifier to the remote computing device over the mobile-device communication network to request permission to use the protected media content, the cryptographically secure identifier usable by the remote computing device to determine that the movable component is authentic and an entity associated with the movable component has a right to the requested use of the protected media content;

transmitting a device identifier identifying the mobile computing device effective to enable the remote computing device to determine whether or not the mobile computing device is trusted;

transmitting a non-encrypted identifier for the movable component effective to enable the remote computing device to authenticate the movable component using at least the non-encrypted identifier and the cryptographically secure identifier; and receiving, from the remote computing device over the mobile-device communication network, permission to use the protected media content based at least in part on an indication from the remote computing device that the mobile computing device is trusted, the permission received responsive to the remote computing device authenticating the movable component using the non-encrypted identifier and the cryptographically secure identifier.

2. The one or more computer-readable storage devices of claim 1, wherein the movable component is a Subscriber Identity Module (SIM).

3. The one or more computer-readable storage devices of claim 1, wherein the movable component is a hardware card that is computationally slow relative to the remote computing device.

4. The one or more computer-readable storage devices of claim 1, wherein the cryptographically secure identifier is computed by the movable component with a symmetric key operation using a secret bound to the movable component and known by the remote computing device.

5. The one or more computer-readable storage devices of claim 1, wherein the act of receiving permission includes receiving information sufficient to enable the mobile computing device to decrypt the protected media content.

6. A method implemented at least in part by a computing device comprising:

receiving, via a mobile-device communication network and from a mobile computing device, a request to use protected media content and a cryptographically secure identifier bound to a movable component physically connected to the mobile computing device but removable from the mobile computing device, the request including a non-encrypted identifier configured to identify the movable component associated with the cryptographically secure identifier, the movable component comprising a token associated with a DRM license, the DRM license permitting the mobile computing device to perform actions on the protected media content, the protected media content stored on a removable memory physically connected to the mobile computing device but removable from the mobile computing device, the request further including a device identifier identifying the mobile computing device and usable to determine whether the mobile computing device is trusted;

determining, based on the cryptographically secure identifier and the non-encrypted identifier, that the movable component is authentic and that an entity associated with the removable component has a right to the requested use of the protected media content; and responsive to determining that the movable component is authentic and that the entity associated with the removable component has a right to the requested use of the protected media content, transmitting information to the mobile computing device via the mobile-device communication network based on a determination that the mobile computing device is trusted, the information sufficient to enable the mobile computing device to use the protected media content.

7. The method of claim 6, wherein the act of determining finds a number and a secret associated with the non-encrypted identifier, decrypts the cryptographically secure identifier using the secret to provide a decrypted identifier, and wherein, if the decrypted identifier matches or is an increment of the number, determining that the movable component is authentic and that the entity has the right to the requested use.

8. The method of claim 6, wherein the act of determining comprises performing an asymmetric key operation and the cryptographically secure identifier is computed by the movable component with a symmetric key operation.

9. The method of claim 6, wherein the computing device on which the method is implemented at least in part includes a server having fast computational abilities compared to computational abilities of the movable component.

10. The method of claim 9, wherein the movable component is a hardware Subscriber Identity Module (SIM) card that is computationally slow relative to the server.

11. The method of claim 6, wherein the information comprises a key usable by the mobile computing device to decrypt the protected media content.

12. A method implemented at least in part by a mobile computing device comprising:

requesting, from a movable component physically connected to the mobile computing device but removable from the mobile computing device, a cryptographically secure identifier bound to the movable component, identifying the movable component, and not decryptable by the mobile computing device but decryptable by a remote computing device capable of communication with the mobile computing device using a mobile-device communication network, the movable component comprising a token associated with a DRM license, the DRM license permitting the mobile computing device to perform actions on protected media content that is stored on a removable memory physically connected to the mobile computing device but removable from the mobile computing device;

receiving the cryptographically secure identifier from the movable component;

transmitting the cryptographically secure identifier to the remote computing device over the mobile-device communication network to request permission to use the protected media content, the cryptographically secure identifier usable by the remote computing device to determine that the removable component is authentic and an entity associated with the removable component has a right to the requested use of the protected media content;

transmitting a device identifier identifying the mobile computing device effective to enable the remote computing device to determine whether the mobile computing device is trusted;

transmitting a non-encrypted identifier for the movable component effective to enable the remote computing device to authenticate the movable component using at least the non-encrypted identifier and the cryptographically secure identifier; and receiving, from the remote computing device over the mobile-device communication network, permission to use the protected media content based on a determination that the mobile computing device is trusted, the permission received responsive to the remote computing device authenticating the movable component using the non-encrypted identifier and the cryptographically secure identifier.

13. The method of claim 12, wherein the movable component is a Subscriber Identity Module (SIM).

14. The method of claim 12, wherein the movable component is a hardware card that is computationally slow relative to the remote computing device.

15. The method of claim 12, wherein the cryptographically secure identifier is computed by the movable component with a symmetric key operation using a secret bound to the movable component and known by the remote computing device.

16. The method of claim 12, wherein the act of receiving permission includes receiving information sufficient to enable the mobile computing device to decrypt the protected media content.

17. The method of claim 12, wherein the movable component is configured to store a unique secret key and nonce.

18. The method of claim 12, wherein the DRM license includes multiple license identifiers including at least one of a customer identifier, a service identifier, or a domain identifier, the multiple identifiers being usable to authenticate the mobile computing device to a license server of a DRM system.

* * * * *